Patented May 4, 1943

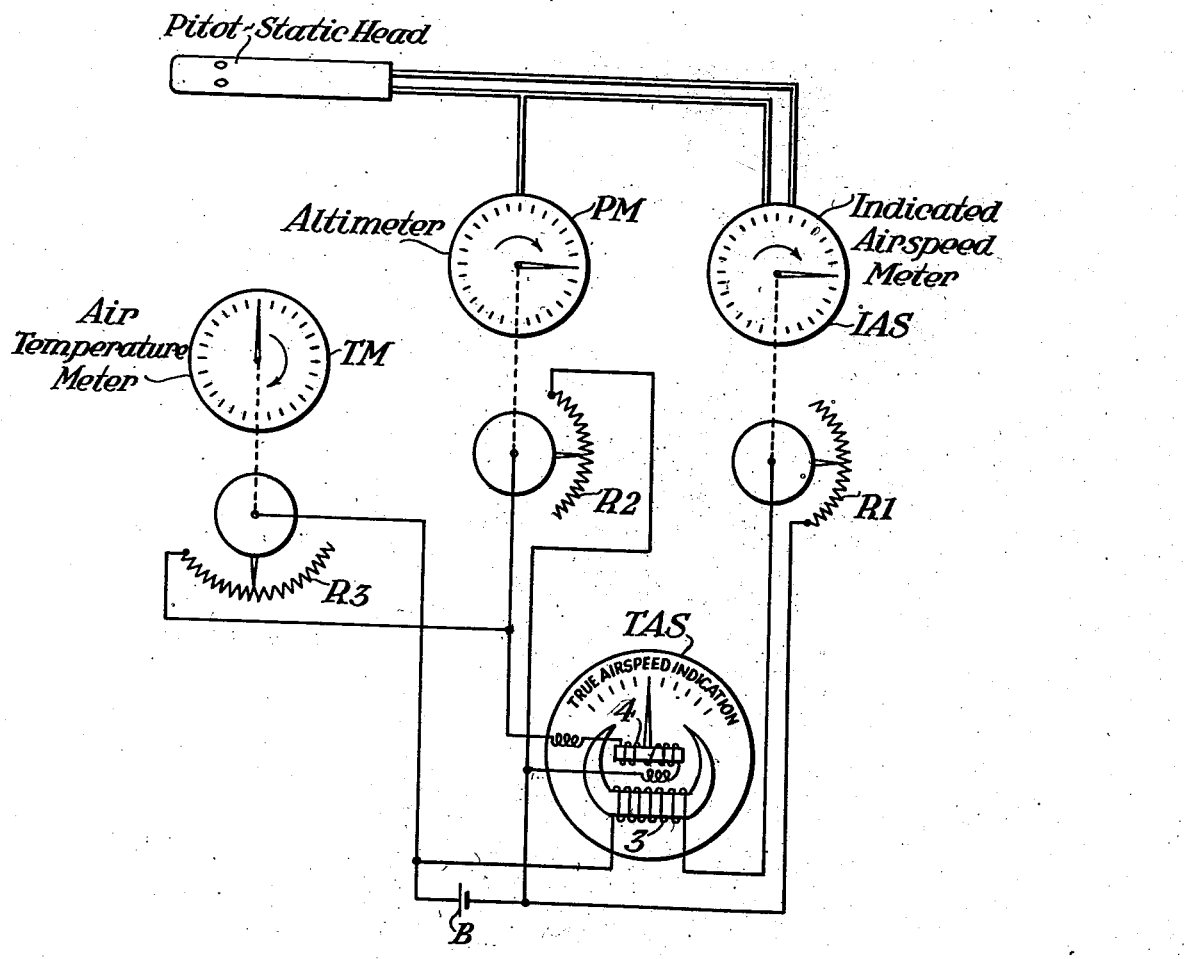

2,318,153

UNITED STATES PATENT OFFICE 2,318,153

TRUE AIRSPEED INDICATOR

Robert D. Gilson, Parkville, Md.

Application December 7, 1940, Serial No. 368,982

6 Claims. (Cl. 73—182)

My invention relates to indicators for aircraft and more particularly to instruments which provide an accurate indication of the speed of the craft relative to the air medium in which it is traveling. In practicing my invention, electrical forces which are related to the indicated airspeed, barometric pressure, and air temperature are combined to produce an indication corresponding to the true air speed.

One object of my invention is to provide an instrument of the above character in which the airspeed indication will be automatically corrected for the effect of changes in barometric pressure. Another object of my invention is to correct the airspeed indication automatically for the effect of changes in air temperature. A further object of my invention is to compensate the airspeed indication for the effects of changes in both barometric pressure and air temperature so that a single indicator will provide an accurate reading of the true airspeed without the necessity for computation or the use of charts and correction factors. A still further object of my invention is to provide an instrument of the above character which is simple in construction, reliable in operation, and relatively inexpensive to manufacture. Other objects, purposes and features of my invention will be apparent from the description which follows.

I accomplish the foregoing objects by translating the indicated airspeed, barometric pressure, and air temperature into electrical forces and properly combining these forces in a suitable electrical indicator such, for example, as an electrodynamometer type of instrument.

I shall describe one form of true airspeed indicator embodying my invention and shall then point out the novel features thereof in claims.

The accompanying drawing is a diagrammatic view showing one form of apparatus embodying my invention in which the true airspeed indicator is combined with standard instruments which indicate airspeed, barometric pressure, and air temperature.

The usual type of airspeed indicator consists of a pressure gauge connected to a Pitot-static tube. The gauge registers the difference between the total pressure developed by air flowing past the tube and the barometric or static pressure. This differential pressure is also known as the dynamic or velocity pressure. As is well known, the differential pressure depends both on the speed of the air stream and the density of the air. The air density in turn, depends on the barometric pressure and the temperature of the air. Mathematically, this can be expressed by the formula:

$$q = \tfrac{1}{2} dV^2$$

where $q$ = differential pressure
$d$ = air density
$V$ = speed of the air stream Accordingly, if the instrument is calibrated to read accurately at a standard barometric pressure such as that at sea level, it will not indicate true airspeed at other pressures or altitudes. The reading given by such an instrument is commonly known as the "indicated airspeed" and will be so referred to herein. Also, since the indication of such an instrument is affected by the air temperature and since the calibration is made at a standard temperature such as 15° centigrade, a further correction must be introduced for the air temperature. The effect of the barometric pressure and air temperature factors on the true airspeed will be described more fully hereinafter.

Although sensitive and accurate airspeed indicators, altimeters, and air temperature meters are well known, there has not heretofore been available, as far as I am aware, an instrument in which the factors of indicated airspeed, barometric pressure, and air temperature are combined to provide a true airspeed indication. The procedure at present is to note the separate readings of the airspeed indicator, altimeter, and air temperature meter, then employ conversion factors, curves, or tables to compute the true airspeed. Obviously, this procedure not only requires time and effort, but unless carefully performed, is likely to produce inaccurate results. Since a knowledge of the true airspeed is at all times essential for evaluating the performance characteristics of aircraft and for flight safety, a single instrument which provides this information at a glance, without computation, is highly desirable. It is the purpose of my present invention to provide such an instrument.

In order that the invention may be more clearly understood, I shall first explain the principles upon which the operation of my true airspeed indicator is based. As pointed out hereinbefore, the differential pressure developed by the Pitot-static type of instrument depends on the speed of the craft with reference to the air as well as the density of the air through which the aircraft is traveling. Since the air density varies inversely with absolute temperature and directly with barometric pressure, it is evident that the readings of the Pitot-static airspeed indicator which has been calibrated to a sea level pressure of 760 mm. of mercury and a standard temperature of 288° absolute (15° C.) must be corrected for the effects of altitude and temperature when these differ from the calibration pressure and temperature, as will occur in flight conditions. The pressure and temperature set forth above are known as the "standard conditions" for air at sea level, as defined by the United States Bureau of Standards, and are used as arbitrary bases for the calibration of commercial instruments.

The correction formula is:

$$S_t = S_i \sqrt{\frac{P_s T}{P T_s}} = S_i \sqrt{\frac{760}{P}} \sqrt{\frac{T}{288}}$$

Where $T_s$=standard air temperature (288° absolute)
$T$=air temperature (absolute) at flight level
$P_s$=standard pressure (760 mm. Hg)
$P$=barometric pressure at flight level
$S_t$=true airspeed
$S_i$=indicated airspeed From the above formula it will be apparent that the true airspeed depends on three factors and is directly proportional to the indicated airspeed; inversely proportional to the square root of the barometric pressure; and directly proportional to the square root of the absolute temperature. I combine these three factors in proper relation in a single instrument which may be of the wattmeter or electrodynamometer type, as shown in the drawing, the deflection of which on a suitably calibrated scale indicates the true airspeed directly in miles per hour or in any other suitable unit of speed.

Referring now to the drawing, since the indicated airspeed factor enters linearly into the above equation for true airspeed, the indicated airspeed can be translated directly into electrical terms, preferably electric current, by means of a source of substantially constant potential B and a variable resistor R1 controlled by the differential pressure of the Pitot-static nozzle or by the deflection of the indicated airspeed meter IAS itself. The resistor R1 is connected in a series circuit with one winding 3 of the true airspeed meter TAS and the resistance of this winding is relatively low as compared with the ohmic value of resistor R1 so that the current in winding 3 is, for all practical purposes, determined almost entirely by this resistor. The design of the resistor R1 depends upon the scale or deflection of the indicated airspeed meter IAS or on the mechanism which responds to the differential pressure of the Pitot-static head so that this resistor may be either uniform or tapered in value, as required. Preferably, resistor R1 should be so designed that a given change in speed will result in the same percentage change in current through the winding 3, that is, doubling the indicated speed as from 100 to 200 miles per hour should also cause the current in winding 3 to double. The relation between current in winding 3 and the indicated airspeed may be expressed as follows:

$$I_1 = K_1 S_1$$

where $I_1$=current in element 3
$K_1$=a constant
$S_1$=indicated airspeed

Since the indicated airspeed must vary as the square root of the differential pressure, the current in winding 3 will also vary as the square root of this pressure.

The adjustment in current with indicated airspeed can be obtained in any preferred manner, such as by a suitable mechanical linkage shown diagrammatically in the drawing by means of the broken line joining the airspeed meter IAS with the rheostat R1. One form of rheostat having a driving connection with an air pressure responsive member is shown in United States Patent No. 2,178,422, granted to J. P. Heagney on October 31, 1939. The operating member 18 of this rheostat could, for example, be operated by the movement of the stud 24 of the bellows 9—10—11 in Fig. 3 of the United States Patent No. 2,137,194, granted to P. F. Weber on November 15, 1938. By properly tapering the resistor R1 in a manner which is well known in radio volume control work, any desired variation of current in winding 3 with variation in the indicated air speed can thus be obtained. Obviously, any one of a large number of well-known means can be used for causing the rheostat arm to follow the movement of the airspeed meter pointer, the important consideration being a reliable transfer of the motion with a minimum load imposed on the mechanism of the meter. If desired, the rheostat can be made an integral part of the airspeed meter IAS itself. When used in conjunction with commercial airspeed meters, it will be found, in general, that the resistor R1 must be tapered in value, unless compensation is provided in the linkage, the resistance decreasing very rapidly from a high initial value at low readings of gradually increasing indicated airspeed, and thereafter decreasing at a relatively slow rate for large changes at high readings of the indicated airspeed. The arrow on each of the meters IAS, PM, and TM indicates the direction of pointer movement for an increase in airspeed, altitude, and air temperature, respectively.

The air pressure meter or altimeter PM exercises control over the current in the second element or winding 4 of the meter TAS by virtue of the rheostat R2 which it operates upon a change in barometric pressure. The resistance of rheostat R2 is relatively low as compared with the resistance of winding 4 and also as compared with the resistance of the rheostat R3 which is operated by the air temperature meter TM.

As the pointer of the altimeter PM moves from the zero or sea level end of the scale (760 mm. Hg barometric pressure) toward the upper limit where it indicates an altitude of about 30,000 feet (226 mm. Hg) the resistor R2 increases in value inversely as the square root of the barometric pressure. That is to say, R2 increases when P decreases and this inverse relation is not a linear one but is exponential since it includes P to the one-half power as a factor. This variation may be represented by the following formula:

$$R2 = K_2 \sqrt{\frac{760}{P}}$$

where

R2=resistance of altimeter rheostat
$K_2$=a constant
P =barometric pressure at flight level This square root variation of resistor R2 is readily obtainable in practice, although if the movement of the rheostat arm is uniform for correspondingly uniform pressure changes, then this resistor must obviously be tapered in value. The operating connection for this resistor could be made, for example, with a barometric member such as the upper face 105 of bellows 95 in the United States Patent No. 2,251,498, granted to L. N. Schwien on August 5, 1941. If this operating connection includes no compensating linkage of such form as would provide the square root variation of resistor R2 with pressure changes, then the resistor must be of the tapered type previously referred to. If it is preferred to provide compensation within the mechanical linkage or operating connection itself, a suitable form of compensation for providing a non-linear relation between the actuating member and the member operated thereby is shown in the above Schwien patent so that the details of such a linkage will be adequately clear from this patent. It will be noted that the winding 4 is connected in parallel with the resistor R2.

The torque developed in the meter TAS results from the interaction of the field due to winding 3 with the current in winding 4 or, looking at the matter from another viewpoint, this torque can be said to result from the interaction of the field due to winding 3 with the field due to winding 4.

Connected in series with the resistor R2 across the battery B is a resistor R3 which compensates the current in winding 4 for changes in the air temperature. Since resistor R3 has a relatively high value as compared with resistor R2, it will be apparent that the total current in the circuit which includes resistor R3 and the multiple combination of resistor R2 and winding 4 will, for all practical purposes, depend only on resistor R3. As the air temperature increases, the value of resistor R3 is reduced in such a manner that the current in the circuit increases in proportion to the square root of the absolute temperature. This relation may be represented by the following formula:

$$I_3 = K_3 \sqrt{\frac{T}{288}}$$

where $I_3$ = total current in the circuit
$K_3$ = a constant
$T$ = air temperature in degrees absolute Resistor R3 would be designed in a similar manner to resistors R1 and R2 previously discussed, to provide the square root relation between the current $I_3$ and the temperature indication. A tapered resistor R3 could, for example, be operated by the stem 161 in Fig. 2 of the Schwien patent. If not tapered, then the resistor R3 could, for example, be operated by the plunger 200 of Fig. 2 of the Schwien patent, through the medium of a suitable compensating linkage such as generally shown in this patent and providing the required relation between current and temperature.

Since the ohmic value of resistor R2 is small as compared with winding 4, practically all of the current $I_3$ will flow through the resistor R2. The voltage drop across this resistor equals the product of the resistance R2 and current $I_3$ and this is the voltage which is applied across the terminals of winding 4, as will be clear from the drawing. The current flowing in the winding 4 is proportional to the voltage applied to this winding and if we designate this current as $I_4$, then this current may be represented by the following formula:

$$I_4 = K_4 I_3 R2 = \left(K_3 \sqrt{\frac{T}{288}}\right)\left(K_2 \sqrt{\frac{760}{P}}\right)$$

or, combining constants, $$I_4 = K_5 \sqrt{\frac{760}{P}} \sqrt{\frac{T}{288}}$$

Since the deflection of an electrodynamometer or wattmeter type of instrument such as TAS is proportional to the product of the currents in its two elements, this deflection may be written as:

$$D = K_6 I_1 I_4$$

or, upon substituting for $I_1$ and $I_4$, $$D = K\left(\sqrt{\frac{760}{P}} \sqrt{\frac{T}{288}}\right) S_i$$

If now the scale of the wattmeter instrument TAS is divided in such a manner that at standard pressure and temperature (760 mm. Hg and 288° abs.) the scale values agree precisely with those of the indicated airspeed meter IAS, the constant K in the last formula becomes unity and the formula will now read:

$$D = S_i \sqrt{\frac{760}{P}} \sqrt{\frac{T}{288}}$$

The right-hand member of this formula is identical with that of the formula for the true airspeed presented in the early part of this disclosure so it follows that the deflection of the meter TAS will indicate the true airspeed.

As pointed out hereinbefore, the resistor R1 may be included as an integral part of the airspeed meter IAS, or this meter may be dispensed with entirely and the resistor R1 operated by suitable means responsive to the differential pressure developed in the Pitot-static head. Similarly, resistors R2 and R3 may likewise be an integral part of the air pressure and air temperature meters, respectively, or be suitably operated by changes in barometric pressure and air temperature without the necessity for these auxiliary meters, as such. It will be understood, of course, that the rheostat arms of resistors R1, R2, and R3 must maintain dependable, low resistance electrical contact and that the voltage of the source B must remain substantially constant in order to insure a high degree of accuracy in the indication of the true airspeed meter TAS.

From the foregoing description of one rather specific embodiment of my invention, it will be apparent that I have provided a simple, rugged, and reliable aircraft instrument which automatically corrects for the influence of the barometric pressure and air temperature on the indicated airspeed and provides at all times a direct reading of the true airspeed without the necessity for computation. Moreover, I have disclosed a broadly useful method for converting the response of a plurality of instruments or devices such as an airspeed meter, a barometric instrument, and an air temperature meter, into electrical forces and suitably combining these forces in proper proportion so as to obtain a resultant which varies in accordance with the combined forces.

It will be understood that the particular design and proportion of the electrical and magnetic circuits of the true airspeed meter TAS is not of critical importance and has been shown diagrammatically for purposes of simplicity rather than in any limiting sense. The electrical and magnetic circuits of this instrument may obviously take numerous suitable and well-known forms, the important consideration being merely to provide a suitably damped electrodynamometer type of instrument which will have sensitive response over the desired range of electrical forces corresponding to the quantities or factors which produce them. The invention is also not limited to the use of a direct current source because by proper design the airspeed meter TAS can be made to respond equally well to current supplied from an alternating current source replacing the source B.

Although I have herein shown and described only one form of true airspeed indicator embodying my invention, it is understood that various changes and modifications may be made therein within the scope of the appended claims without departing from the spirit and scope of my invention.

Having thus described my invention, what I claim is:

1. An airspeed indicator for aircraft comprising, in combination, an electrodynamometer having a first and a second element, a source of current, an indicated airspeed meter, an altimeter, a first rheostat connected in series with said first element across said source and operated in accordance with the indication provided by said airspeed meter, a second rheostat connected across said second element and operated in accordance with the indication provided by said altimeter, and means for supplying current from said source to the terminals of said second element, whereby said electrodynamometer will provide an airspeed indication which depends on the indication of both said airspeed meter and said altimeter.

2. An airspeed indicator for aircraft comprising, in combination, an electrodynamometer having a first and a second element, a source of current, an indicated airspeed meter, an altimeter, an air temperature meter, a first rheostat connected in series with said first element across said source and operated in accordance with the indication provided by said airspeed meter, a second rheostat connected across said second element and operated in accordance with the indication provided by said altimeter, and a third rheostat connected in series with said source and the multiple combination of said second rheostat and said second element, said third rheostat being operated in accordance with the indication provided by said air temperature meter, whereby said electrodynamometer will provide an airspeed indication which depends on the indication of said airspeed meter, said altimeter, and said air temperature meter.

3. An airspeed indicator for aircraft comprising, in combination, an electrodynamometer having a first and a second element, a source of current, an indicated airspeed meter, an altimeter, an air temperature meter, a first rheostat having a resistance substantially greater than the resistance of said first element, said first rheostat being connected in series with said first element across said source and operated in accordance with the indication provided by said airspeed meter, a second rheostat having a resistance substantially lower than the resistance of said second element, said second rheostat being connected across said second element and operated in accordance with the indication provided by said altimeter, and a third rheostat having a resistance substantially larger than the resistance of said second rheostat and connected in series with said source and the multiple combination of said second rheostat and said second element, said third rheostat being operated in accordance with the indication provided by said air temperature meter, whereby said electro-dynamometer will provide an airspeed indication which depends on the indication of said airspeed meter, said altimeter, and said air temperature meter.

4. An airspeed indicator for aircraft comprising, in combination with a first means responsive to the differential pressure resulting from movement of the craft through the air and a second means responsive to the barometric pressure at flight level, of an electro-dynamometer having a first and a second element, a source of current, a first current controlling device connected in series with said first element across said source and governed by said first means, a second current controlling device connected across said second element and governed by said second means, and means for supplying current from said source to the terminals of said second element, whereby said electrodynamometer will provide an airspeed indication which depends on both said differential pressure and said barometric pressure.

5. An airspeed indicator for aircraft comprising, in combination with a first means responsive to the differential pressure resulting from movement of the craft through the air and a second and a third means responsive to the barometric pressure and air temperature respectively at flight level, of an electrodynamometer having a first and a second element, a source of current, a first current controlling device connected in series with said first element across said source and governed by said first means, a second current controlling device connected across said second element and governed by said second means, and a third current controlling device governed by said third means and connected in series with said source and the multiple combination of said second current controlling device and said second element, whereby said electrodynamometer will provide an airspeed indication which depends on said differential pressure, on said barometric pressure, and on said air temperature.

6. An airspeed indicator for aircraft comprising, in combination with a first means responsive to the differential pressure resulting from movement of the craft through the air and a second means responsive to the barometric pressure at flight level, of a two-element electroresponsive device, said device requiring simultaneous energization of both elements for operation, a source of current, a first current controlling device connected in series with one element of said device across said source and governed by said first means, a second current controlling device connected across the other element of said device and governed by said second means, and means for supplying current from said source to the terminals of said other element, whereby said electroresponsive device will provide an airspeed indication which depends on both said differential pressure and said barometric pressure.

ROBERT D. GILSON.